United States Patent
McClendon

(10) Patent No.: US 6,820,906 B1
(45) Date of Patent: Nov. 23, 2004

(54) HAND TOOL FOR INSTALLING TIE-DOWN STRAP CORNER PROTECTOR

(76) Inventor: Verlin McClendon, 743 Van Zandt County Rd. 4910, Ben Wheeler, TX (US) 75754

( * ) Notice: Subject to any disclaimer, the term of this patent is extended or adjusted under 35 U.S.C. 154(b) by 76 days.

(21) Appl. No.: 10/295,237

(22) Filed: Nov. 15, 2002

(51) Int. Cl.[7] .............................. B25J 1/00; B60P 7/06
(52) U.S. Cl. ........................ 294/19.1; 294/104; 410/41; 410/99
(58) Field of Search ........................ 294/19.1, 22, 50.9, 294/74, 104; 15/145, 150, 152; 410/41, 98, 99, 100, 103

(56) References Cited

U.S. PATENT DOCUMENTS

| | | | | |
|---|---|---|---|---|
| 967,263 A | * | 8/1910 | Payne ........................ 294/104 |
| 1,826,365 A | * | 10/1931 | Rosen ........................ 294/50.9 |
| 2,388,137 A | * | 10/1945 | Graumlich ................. 81/53.11 |
| 2,575,561 A | * | 11/1951 | Payne ........................ 294/19.1 |
| 2,716,043 A | * | 8/1955 | Baril ......................... 294/19.1 |
| 3,115,657 A | * | 12/1963 | Kikas ........................ 294/104 |
| 3,863,289 A | * | 2/1975 | Whittaker ................... 15/228 |
| 3,937,512 A | * | 2/1976 | Baughman ................. 294/19.1 |
| 4,516,360 A | * | 5/1985 | Gringer et al. ............... 15/231 |
| 4,611,512 A | * | 9/1986 | Honda ..................... 294/119.3 |
| 4,765,479 A | * | 8/1988 | Roberts ...................... 206/453 |
| D342,196 S | * | 12/1993 | Lopack ........................ D7/688 |
| 5,493,758 A | * | 2/1996 | Carmien ..................... 15/144.3 |
| 5,596,863 A | * | 1/1997 | Kasel ........................ 53/399 |
| D379,401 S | * | 5/1997 | Cobb ......................... D22/142 |
| 5,730,033 A | * | 3/1998 | Mitrowski .................. 294/19.1 |
| 5,823,590 A | * | 10/1998 | Forrest et al. .............. 294/19.1 |
| 5,848,865 A | * | 12/1998 | Beals ........................... 410/99 |
| 6,526,619 B1 | * | 3/2003 | Cassels, Jr. ................ 294/19.1 |

FOREIGN PATENT DOCUMENTS

AU 0080643 * 11/1976 ................. 294/19.1

* cited by examiner

*Primary Examiner*—Paul Chin

(57) ABSTRACT

A hand tool for lifting and positioning a corner protector under the cargo tie-down strap on a flatbed trailer or other cargo transportation vehicle. This tool will enable the corner protector to be quickly and easily applied by the truck driver while standing on the ground, thereby eliminating the need for scaling the side of the loaded flatbed trailer. It will speed up the loading operation and avoid a possible fall to the ground from an elevated height. The tool has a straight tubular handle that can be connected to a telescoping extension pole for reaching the top of tall cargo loads. The working end of the tool has front and back clamping panels hingedly connected by a spring-loaded clamping-jaw means that can clamp a corner protector between the panels. In use, the corner protector is inserted between the front and hack panels of the installation tool, with extension pole attached. Then, holding the tool with one hand and slightly lifting the tie-down strap with the other hand, the corner protector is placed over the cargo corner to be protected. The strap is then pull downward on to the top of the corner protector and the installation tool is pull downward disengaging it from the corner protector, thereby leaving the corner protector in place under the strap.

7 Claims, 3 Drawing Sheets

HAND TOOL FOR INSTALLING TIE-DOWN STRAP CORNER PROTECTOR

BACKGROUND OF THE INVENTION

1. Field of the Invention

The present invention relates to a hand tool for installing tie-down strap corner protectors for use in connection with securing cargo loads in the trucking or other transporting industry. The strap corner protector installation tool has particular utility in connection with reaching and placing corner protectors under tie-down straps in areas around sharp corners, while standing on the ground.

2. Description of the Prior Art

In the trucking industry and other industries involving the transporting of goods, safety is a major concern. It is essential that heavy loads, which often may reach heights up to at least 14 feet, be securely tied down. Strapping and chaining techniques are generally used to properly secure these loads. Where the tie-down straps are pulled tightly over sharp corners, they can become frayed and even cut from the rigors of travel. As a result, corner protectors are often installed over the corners and under the strap to protect both the strap and the cargo. These corner protectors can also be used with chains to help protect the cargo. Since the cargo loads may be tall, the trucker will often have to climb up on top of the load to install the corner protector, which in itself can be a dangerous situation. The present invention discloses a tool that allows these corner protectors to be installed easily and quickly while standing on the ground.

The use of tools for reaching high places and performing specific jobs, as well as cargo corner protectors in general are known in the prior art. For example, U.S. Pat. No. 5,596,863 to Kasel discloses a method and apparatus for applying edge protectors underneath strapping. However, the Kasel '863 patent has a different structure from that of the present invention in that it does not disclose a simple hand tool for installing the corner protectors, but rather a large mechanical frame that is raised and lowered to install the edge protectors on the cargo load.

U.S. Pat. No. 5,848,865 to Beals discloses a lading tie-down strap protector for shielding a tie-down strap in the corner areas of lading or cargo loads and U.S. Pat. No. 4,765,479 to Roberts discloses a strapping corner support. However, both the Beals '865 patent and the Roberts '479 patent are different functionally since they address the corner protectors, but do not address the installation of these protectors.

U.S. Pat. Nos. 4,611,512 to Honda and 2,388,137 to Graumlich disclose devices for replacing fluorescent lamps in high installations, both of which use a long pole for reaching up and changing the lamps. However, both the Honda '512 and Graumlich '137 patents have a different structure from that of the present invention and do not offer the fixturing needed to address the issue of installing corner strapping protectors over cargo loads.

Similarly, U.S. Pat. No. 4,516,360 to Gringer et al. discloses a molded pole-type sandpapering tool for sanding at elevated heights while standing on the floor. However, the Gringer '360 patent has a different structure from that of the present invention and does not offer the fixturing needed to address the issue of installing corner strapping protectors over cargo loads.

Lastly, U.S. Pat. Nos. 5,493,758 to Carmien, D379,401 to Cob discloses apparatus that may be of general interest and pertinent to the construction and design of the present invention. The Carmien '758 and the Cob '401 patents disclose an extension pole and the design of a telescoping pole, respectively, both of which may relate to the present invention. However, these patents do not offer the fixturing needed to address the issue of installing corner strapping protectors over cargo loads.

While the above-described devices fulfill their respective, particular objectives and requirements, the aforementioned patents do not describe a hand tool for use in installing cargo corner protectors from a ground position. While the Honda '512, Graumlich '137, and Gringer '360 patents disclose apparatuses for performing operations at elevated heights, they make no provision for providing fixturing needed to address the issue of installing corner strapping protectors over cargo loads.

Therefore, a need exists for a new and improved hand tool that can be used for installing cargo corner protectors from a ground position. In this regard, the present invention substantially fulfills this need. In this respect, the hand tool for installing corner tie-down protectors according to the present invention substantially departs from the conventional concepts and designs of the prior art, and in doing so provides an apparatus primarily developed for the purpose of installing tie-down protectors over the corners of cargo loads from a ground position.

SUMMARY OF THE INVENTION

In view of the foregoing disadvantages inherent in the known types of cargo corner protector installation tools now present in the prior art, the present invention provides an improved corner protector installation hand tool, and overcomes the above-mentioned disadvantages and drawbacks of the prior art. As such, the general purpose of the present invention, which will be described subsequently in greater detail, is to provide a new and improved hand tool and method that has all the advantages of the prior art mentioned heretofore and many novel features that result in a corner protector installation hand tool that is not anticipated, rendered obvious, suggested, or even implied by the prior art, either alone or in any combination thereof.

The present disclosed invention is comprised of a hand tool for lifting and positioning a corner protector under the cargo tie-down strap on a flatbed trailer or other cargo transportation vehicle. This tool will enable the corner protector to be quickly and easily applied by the truck driver while standing on the ground, thereby eliminating the need for scaling the side of the loaded flatbed trailer. It will speed up the loading operation and avoid a possible fall to the ground from an elevated height.

The tool measures approximately 12 inches long, 1¼ inches tall, and 4½ inches wide. The base is comprised of a straight tubular handle that can be connected to an industrial-grade telescopic pole (purchased separately). The working end of the tool contains a stationary flat rectangular blade-like back panel attached to a back clip and a rectangular flat blade-like front panel attached to a front rotatable clip that is spring-loaded to serve as a jaw-like holder of tie-down corner protectors. The front clip has a clipboard-style spring loaded means that is activated by pressing a small lever handle extending from the front clip, thereby pivoting the spring-loaded jaw of the front panel away from the stationary back panel. This enables the corner protector to be slipped into position and clamped between the front and back panels.

In use, the truck driver will insert a corner protector between the front and back panels of the installation tool, with extension pole attached, and holding the tool with one hand and the loose strap with the other hand, slightly lift the strap and place the corner protector in place under the strap. The strap is then pull downward on top of the corner protector and the installation tool is pull downward disengaging it from the corner protector, thereby leaving the corner protector in place under the strap. The strap is then pulled tight over the corner protector and secured.

Alternately, the installation tool of the present invention can be used with corner protectors in combination with tie-down chains.

Since the lifting, positioning, and releasing of the corner protector is be performed while standing on the ground beside the flatbed, there is no need for climbing, straining, and possibly falling from an elevated height. This hand tool is ideally suited for truck drivers and trucking companies who use corner protectors to protect their straps and loads from possible damage while traveling. It can also be used on ships, railroads, and other shipping carriers.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention is to provide a new corner protector installation hand tool that provides in the apparatuses and methods of the prior art some of the advantages thereof, while simultaneously overcoming some of the disadvantages normally associated therewith.

It is another object of the present invention to provide a new and improved corner protector installation hand tool that may be easily and efficiently manufactured and marketed.

An even further object of the present invention is to provide a new and improved corner protector installation hand tool that has a low cost of manufacture with regard to both materials and labor, and which accordingly is then susceptible of low prices of sale to the consuming public, thereby making such hand tools economically available to the buying public.

Lastly, it is an object of the present invention to provide a new and improved method for installing corner protectors on tall cargo loads from a position on the ground.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
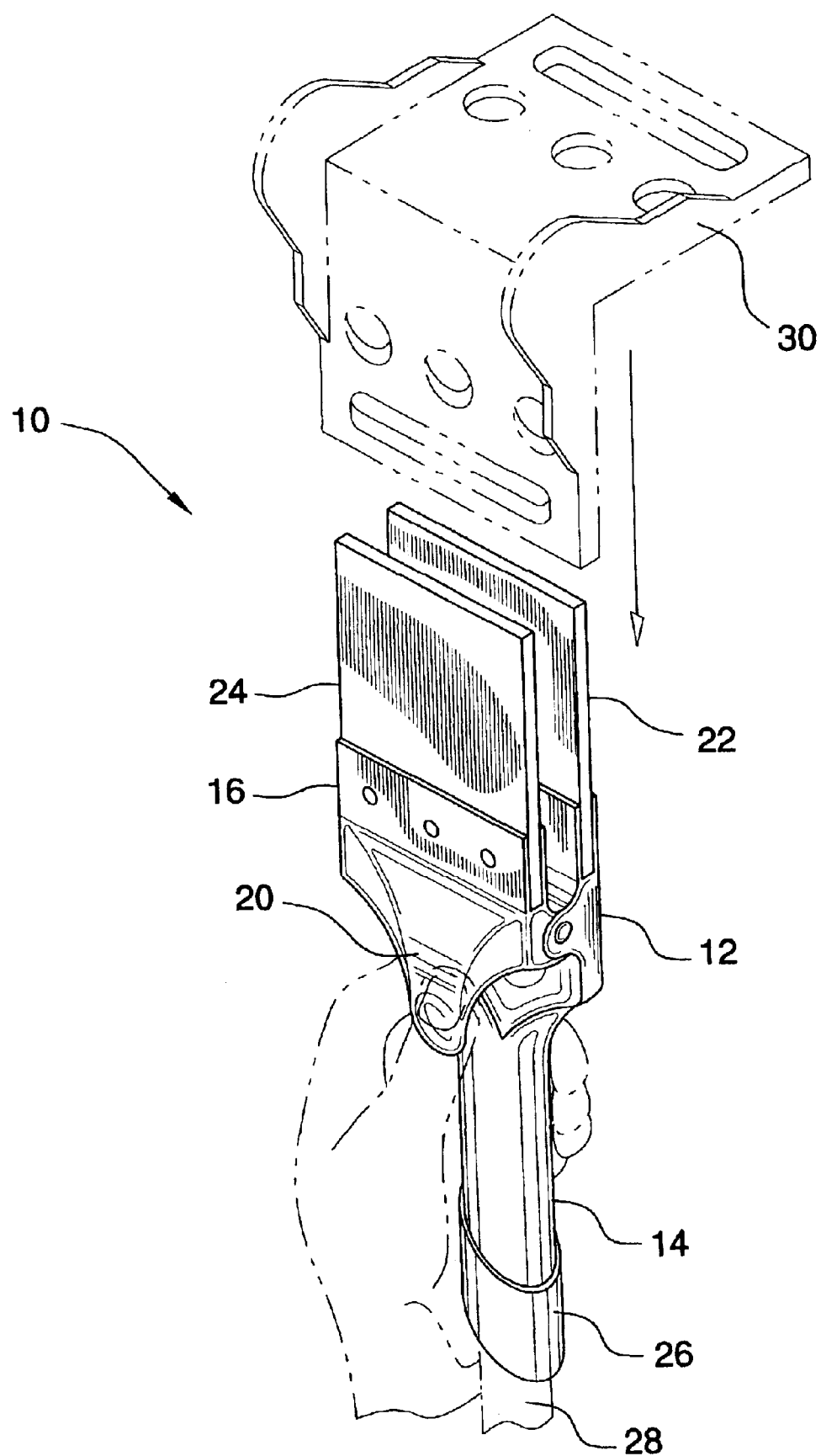
FIG. 1 is a perspective view of the preferred embodiment of the hand tool for installing tie-down strap corner protectors constructed in accordance with the principles of the present invention.
Figure 2:
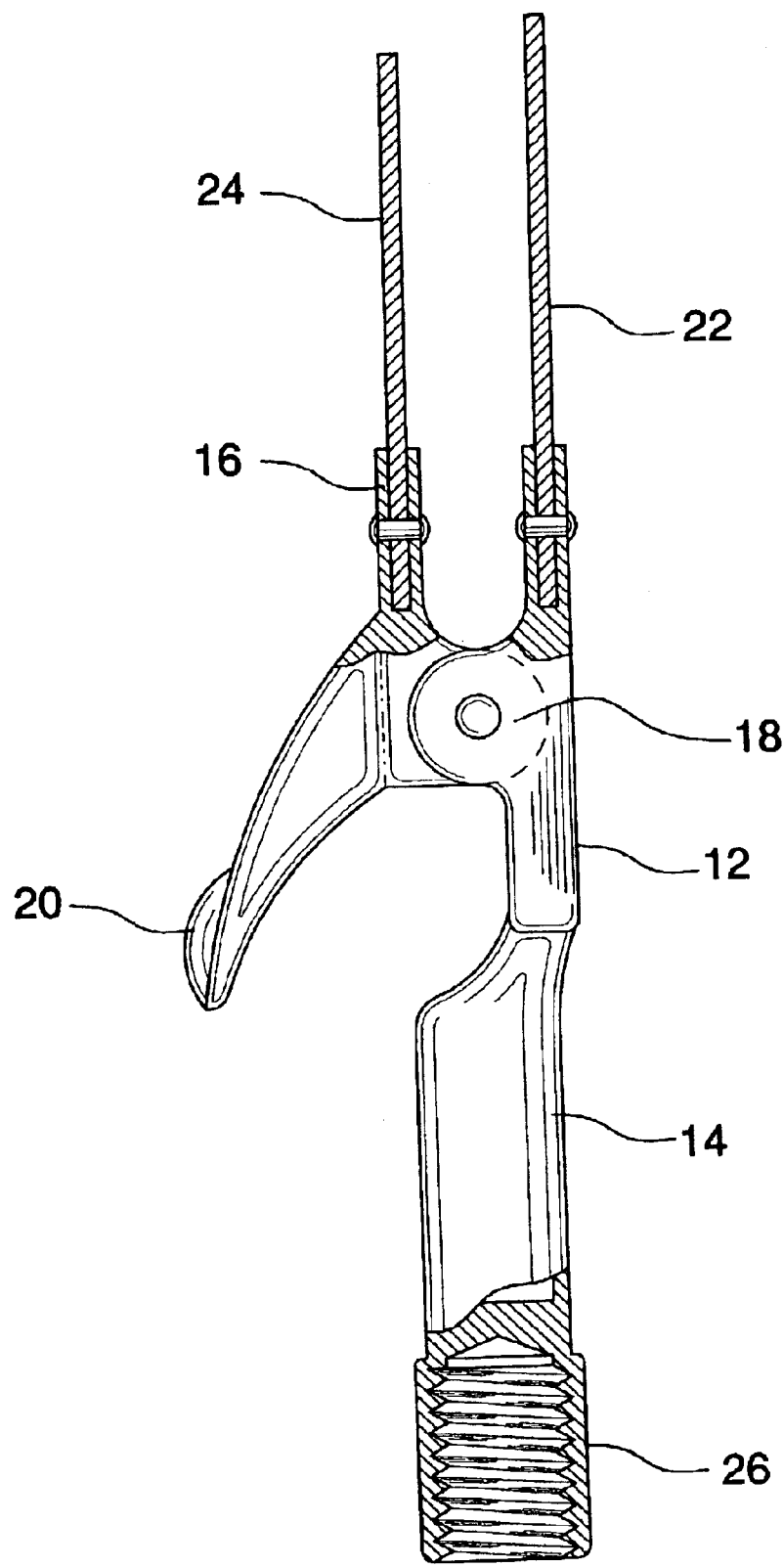
FIG. 2 is a cross-sectional side view of the hand tool for installing tie-down strap corner protectors of FIG. 1.
Figure 3:
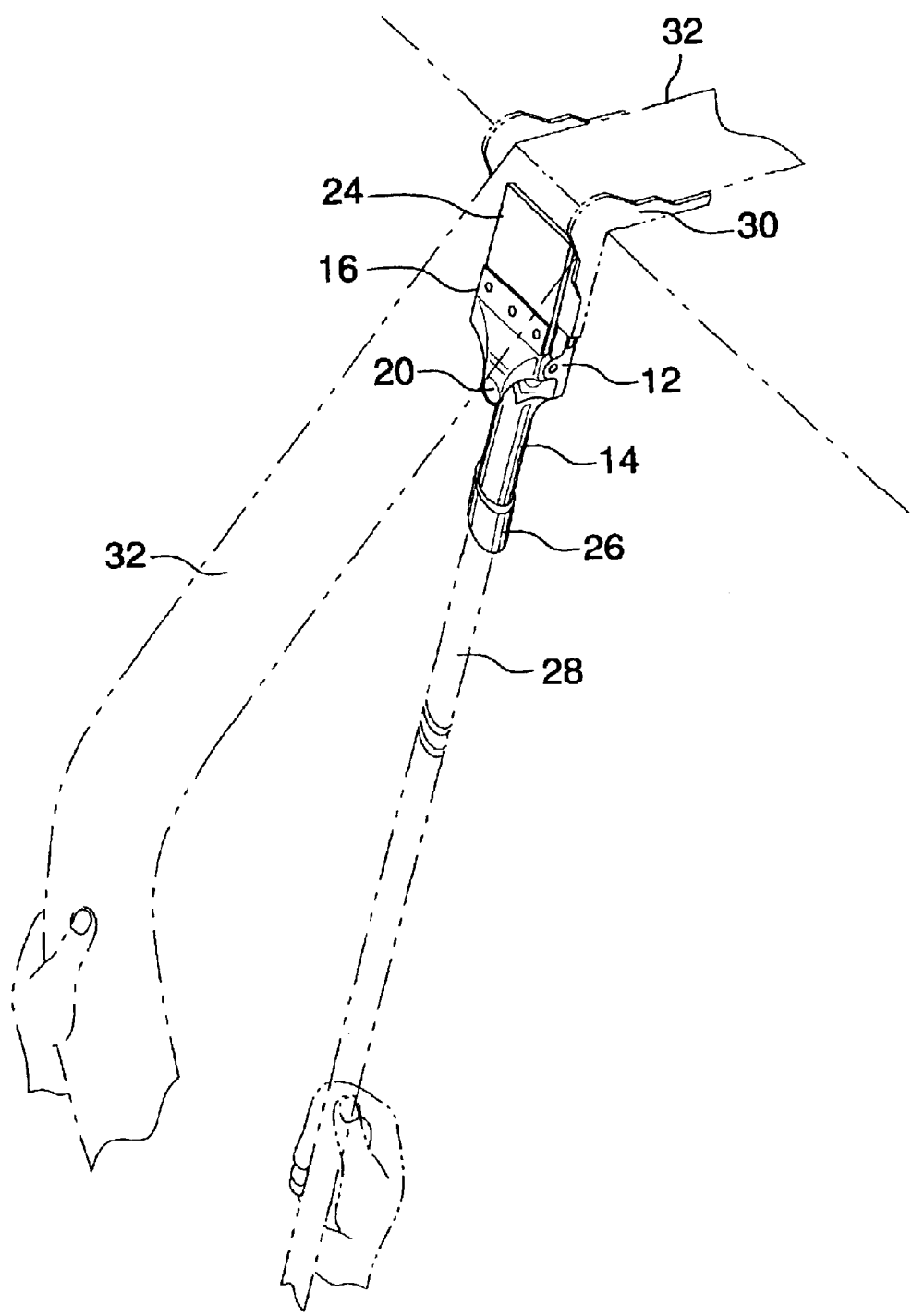
FIG. 3 is a perspective view showing the application of the hand tool for installing tie-down strap corner protectors of the present invention.

Referring now to the drawings, and particularly to FIGS. 1–3, a preferred embodiment of the hand tool for installing tie-down strap corner protectors of the present invention is shown and generally designated by the reference numeral 10.

In FIGS. 1 and 2, a perspective and cross-sectional side view of the new and improved hand tool 10 for installing cargo tie-down strap corner protectors, while standing on the ground, is shown to illustrate and describe the present invention. More particularly, the hand tool 10 for installing cargo tie-down strap corner protectors has a front rotatable clip 16 hingedly attached to a stationary back clip 12, which is attached to a short tubular handle 14. The front clip 16 is spring loaded, by means of a clip spring 18, relative to the back clip 12 to provide clipboard-style, spring-loaded clamping-jaws. Front and back rectangular panels 24,22 are attached upward from the front and back clips 16,12, respectively, with the front panel 24 being slightly shorter in length than the back panel 22 to assist in releasing the tool. In a rest state, the front panel 24 is forced closed against the back panel 22 by the spring-loaded means. Additionally, the front clip 16 has a short lever handle 20 extending outward for opening of the panel clamping-jaws by pressing on the lever handle 20 with the thumb. Finally, an extension handle adapter 26, having a blind hole with internal threads on the bottom end, is attached to the bottom of the tubular handle 14.

FIG. 3 is a perspective view showing the application of the hand tool for installing tie-down strap corner protectors of the present invention. In use, it can now be understood that to install a corner protector under a tie-down strap and over the corner of the cargo, the straps 32 are first loosely placed over the cargo. Then, the panel clamping-jaws of the installation tool 10 of the present invention, with attached commercial grade extension handle (pole) 28, are opened by pressing the front clip lever handle 20 and one end of a corner protector 30 is inserted between the panels 24,22. The front clip lever handle 20 is then released allowing the corner protector to be clamped between the front and back panels 24,22. These corner protectors 30 usually have a right-angle shape to fit snuggly over corner of the cargo. Next, the extension handle 28 is gripped with the favorably hand and the loose tie-down strap 32 is slightly raised with the other hand while the corner protector 30 is raised and positioned in place over the corner of the cargo directly under the tie-down strap 32. The strap 32 is then pulled downward on the topside of the corner protector 30, holding the protector in place, and the installation tool 10 is pulled downward, thereby disengaging the installation tool 10 from the corner protector 30. Finally, the tie-down strap 32 is pulled tight over the corner protector 30 and secured in place. This process is then repeated for each tie-down strap in order to properly secure the cargo load on the truck bed.

While a preferred embodiment of the hand tool for installing cargo tie-down strap corner protectors has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy materials may he used to fabricate the panels and tool frame. Various spring loading means can be utilized to provide the clamping jaw action. Also, various types of extension poles or handles can be used with the installation tool.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for installing cargo corner protectors, comprising the steps of:

placing tie-down straps loosely in place over cargo;

inserting a corner protector into a tie-down strap corner protector installation tool said corner protector installation tool further comprising:

a back clip attached to a handle;

a front clip hingedly attached to said back clip, said front clip being normally forced against said back clip by a spring loading clamping-jaw means, said front clip further having a pressure lever extending downward from said front clip for springably opening said front clip away from said hack clip;

a back rectangular panel attached to said back clip for supporting a first side of said strap corner protector, said back rectangular panel extending upward from said back clip;

a front rectangular panel attached to said front clip for applying pressure against a second side of said strap corner protector, thereby clamping said corner protector between said front and said back panels, said front rectangular panel extending upward from said front clip; and an extension handle adapter attached to the bottom end of said handle;

screwing an extension handle into said extension handle adapter;

gripping said extension handle of said corner protector installation tool in most favorably hand;

holding said tie-down strap in other hand;

lifting said corner protector installation tool under said tic-down strap to the top corner of said cargo;

positioning said corner protector in place over cargo corner and below said tie-down strap;

pulling said tie-down strap downward with said other hand placing pressure on the topside of said corner protector;

pulling downward on said corner protector installation tool handle with said most favorably hand, thereby releasing said corner protector installation tool leaving said corner protector underneath said tie-down strap;

pulling said tie-down strap tight;

fastening said tie-down strap; and repeating said method for the remaining straps, thereby securing the cargo load on a truck bed.

2. The method of claim 1, wherein said spring loading clamping-jaw means is comprised of a clipboard-style spring, said spring providing adequate pressure to clamp said corner protector between said front and back rectangular panels while allowing said tool to be pulled free once said corner protector is installed in place.

3. The method of claim 1, wherein said pressure lever is thumb activated for opening said front and back rectangular panels, thereby allowing the insertion of said corner protector.

4. The method of claim 1, wherein said installation tool is used to install a tie-down chain.

5. The method of claim 1, wherein said extension handle adapter further comprises an internal threaded blind hole suitable for receiving an industrial type extension handle.

6. The method of claim 5, wherein said extension handle is an industrial grade telescoping pole.

7. The method of claim 1, wherein said tool is fabricated from materials of the group comprising: formed sheet metal, molded plastic, aluminum, steel, and a combination of these materials.

* * * * *